(12) United States Patent
Wittrisch

(10) Patent No.: US 7,100,686 B2
(45) Date of Patent: Sep. 5, 2006

(54) CONTROLLED-PRESSURE DROP LINER

(75) Inventor: Christian Wittrisch, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 127 days.

(21) Appl. No.: 10/679,456

(22) Filed: Oct. 7, 2003

(65) Prior Publication Data

US 2004/0108107 A1    Jun. 10, 2004

(30) Foreign Application Priority Data

Oct. 9, 2002    (FR) .................................. 02 12555

(51) Int. Cl.
*E03B 3/20* (2006.01)
(52) U.S. Cl. .................. 166/227; 210/497.01
(58) Field of Classification Search ................ 166/227, 166/235, 236, 144, 157, 205; 210/497.01, 210/497.1
See application file for complete search history.

(56) References Cited

U.S. PATENT DOCUMENTS

| | | | | |
|---|---|---|---|---|
| 1,722,965 A * | 7/1929 | Patton | ........................ | 166/235 |
| 2,179,020 A * | 11/1939 | Ranney | ........................ | 166/381 |
| 5,355,948 A * | 10/1994 | Sparlin et al. | .............. | 166/228 |
| 5,476,143 A | 12/1995 | Sparlin et al. | .............. | 166/233 |
| 5,957,205 A * | 9/1999 | Bohme et al. | .............. | 166/296 |
| 6,464,007 B1 * | 10/2002 | Jones | ........................ | 166/279 |
| 6,581,454 B1 * | 6/2003 | Smith | ...................... | 73/152.54 |
| 6,837,308 B1 * | 1/2005 | Michel | ........................ | 166/51 |
| 2002/0104650 A1* | 8/2002 | Dusterhoft et al. | ......... | 166/227 |
| 2002/0189809 A1* | 12/2002 | Nguyen et al. | .............. | 166/278 |

FOREIGN PATENT DOCUMENTS

| | | |
|---|---|---|
| GB | 2 325 949 | 12/1998 |
| WO | 02/31314 | 4/2002 |

OTHER PUBLICATIONS

Preliminary Search Report.

* cited by examiner

*Primary Examiner*—David Bagnell
*Assistant Examiner*—David P Stephenson
(74) *Attorney, Agent, or Firm*—Antonelli, Terry, Stout and Kraus, LLP.

(57) ABSTRACT

The invention relates to a controlled-pressure drop liner device comprising a circumscribed filter element (9) centred on a base tube (1) by longitudinal braces in relation to the axis of the tube and arranged according to the diameter of the tube so as to divide the annular space defined by the filter element and the tube into sectors delimited by the braces, and in which collecting tubes (5) are arranged and open into the sectors by one end.

The invention applies to tubings intended for drainage or injection in a geologic formation, a hydrocarbon reservoir for example.

11 Claims, 1 Drawing Sheet

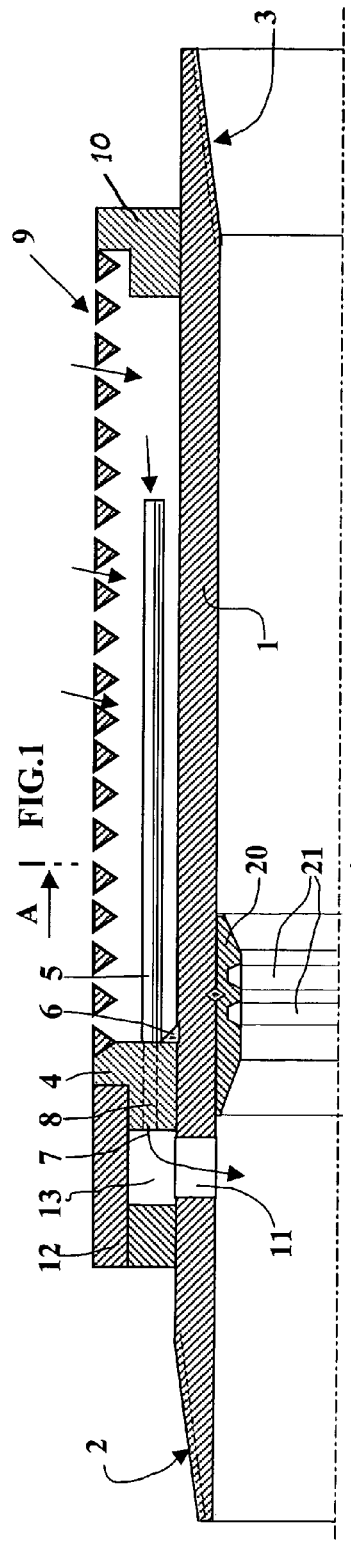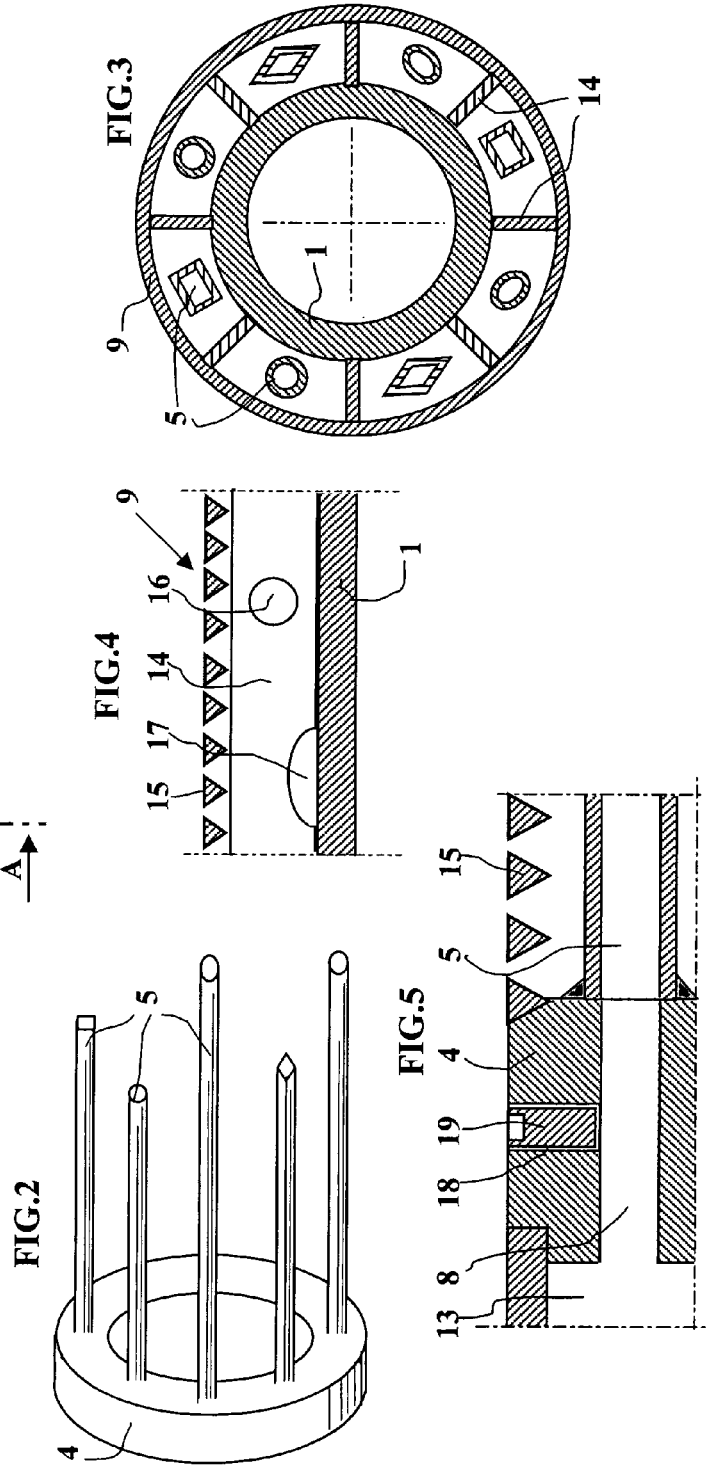

CONTROLLED-PRESSURE DROP LINER

FIELD OF THE INVENTION

The present invention relates to a device for controlling drainage of, a geologic formation by means of a well drilled through the reservoir. The invention is more particularly suited for development of hydrocarbon reservoirs that are reached through horizontal holes or holes greatly inclined to the vertical. To develop a reservoir, an oil reservoir for example, perforated pipe elements are generally placed in the hole so as to allow collection of the effluent in the inner space of the pipe while preventing drain hole clogging due to wall caving or sand encroachment likely to accumulate. These pipe elements can be perforated tubes or more sophisticated liners made from wires wound on a metal support, then welded. The spaces between the wires determine the effluent filtration capacity. The liners can also be made from filter elements, in form of a grate or netting, wound around a support.

The present invention also applies to the injection of a specific fluid into a geologic formation in order to promote production, either to another well or in the same well in a later stage. In this circulation case, the distribution of the pressure drop all along the drain hole is great in order to control and distribute injection in the receiving zones.

BACKGROUND OF THE INVENTION

In the case of drain holes of great length, the pore pressure of the reservoir is commonly either variable over the length thereof and/or the pressure drop in this long production pipe usually has an impact on the effluent flow from the layer to the collection zone. One is therefore sometimes driven to arrange in the drain hole collection tubes having different perforation densities and sections of flow depending on their longitudinal position in the drain hole. Document WO-02/31,314 describes a drain element having a liner consisting of hollow rods for collecting hydrocarbons, said rods having passages whose geometric characteristics are such that they can create, under flow conditions, a determined pressure drop. However, setting up such a liner requires specific means and methods in relation to conventional manufactures.

Documents U.S. Pat. No. 5,269,376 and U.S. Pat. No. 5,242,021 describe production and/or injection methods intended for oil reservoirs, which can advantageously use the present invention.

SUMMARY OF THE INVENTION

The present invention is aimed to provide a liner element allowing to control the pressure drop created by flowlines of the element when a fluid circulates between the outside of the liner and its inner channel, whatever the direction of circulation. The construction of the present invention is simplified and its cost therefore reduced.

The present invention thus relates to a controlled-pressure drop liner device comprising a circumscribed filter element centred on a base tube by longitudinal braces in relation to the axis of the tube and arranged according to the diameter of the tube so as to divide the annular space defined by the filter element and the tube into sectors delimited by said braces, and in which collecting tubes are arranged and open into said sectors by one end.

The braces can include openings so that the sectors communicate hydraulically with one another so as to allow the effluent to circulate.

The annular space between the base tube and the filter element can be closed at both ends by crown-shaped parts and wherein said collecting tubes can be fastened to one face of a crown at the level of bores in the crown so that the inner channel of each collecting tube communicates with the other face of the crown.

The crown can comprise bore closing means.

The annular space can be closed at both ends by crowns carrying collecting tubes.

Openings in the base tube can allow flow of an effluent in the inner space of said tube after circulation through the filter element and the collecting tubes. A sliding sleeve inside the base tube can be suited to close the openings.

The device can be advantageously applied for making a filter pipe placed in a drain hole for collection of an effluent produced by the formation through which the drain hole is drilled.

In a similar way, the device can be used for making a filter pipe placed in a drain hole intended for injection of a fluid, for example to improve production of another drain hole, or to treat the formation in which the drain hole is drilled to activate its production rate or to block water inflows.

BRIEF DESCRIPTION OF THE FIGURES

Other features and advantages of the invention will be clear from reading the description hereafter of embodiments given by way of non limitative examples, with reference to the accompanying figures wherein:

FIG. 1 shows a diagrammatic sectional view of the liner according to the invention, FIG. 2 is a perspective view of the collecting element, FIG. 3 is a partial sectional view of the liner body, FIG. 4 is a longitudinal partial section showing a detail of the filter element, and FIG. 5 shows means for closing a collecting tube.

DETAILED DESCRIPTION

FIG. 1 is a sectional view of a device according to the invention consisting of a tube 1 ended at both ends by connecting means 2, 3, generally pin and box threads. The required number of devices simply has to be screwed together to form a drainage string of determined length.

A crown 4 comprising a set of tubes 5 of determined length and diameter of flow is placed on base tube 1. Crown 4 can be welded onto tube 1, for example as shown by weld 6, or by any other means known to the man skilled in the art. Fastening of each tube 5 to crown 4 is such that the inner channel of the tube communicates with face 7 of the crown through pipes 8.

A filter element 9 surrounds the tubes and it is fastened, on one side, to crown 4 and on the other side to a ring 10. This filter element consists for example of a wire wound on supporting parts arranged along the generating lines of the cylinder. The clearance between the wires determines the filtration capacity. The filter element is described more in detail in FIGS. 3 and 4. The filter element can also be made from a wire cloth whose number of wires per unit area (mesh) determines the filtration size. The filter element can also be made from a perforated plate.

In another version, ring 10 can be replaced by a second collecting crown comprising tubes, similar to crown 4 and tubes 5 of FIG. 1. Thus, in this variant, collecting tubes 5 are arranged parallel in the annular space between base tube 1 and filter sieve 9.

Tube 1 comprises at least one opening 11 allowing passage of the effluent into the inner space of said tube. A hood 12 forms an annular chamber 13 into which open channels 8 of tubes 5, as well as openings 11. In the variant with a double collecting crown, a second annular chamber 13 and openings 11 are provided at the other end of the base tube.

Thus, the effluent coming from the formation can flow through filter element 9 which retains the sands, passes into tubes 5 which communicate with chamber 13, and flows into the inner space of tube 1 through openings 11. The pressure drops caused by this circulation are adjustable as a function of the dimension (length, diameter, roughness) and of the number of tubes that communicate. Means for closing tubes 5 are accessible from the outside of the device so as to allow adjustment of the pressure drops during installation, by increasing or by decreasing the number of tubes in service. FIG. 5 shows more in detail an embodiment of a means for closing tubes 5.

FIG. 1 shows a sleeve 20 inside base tube 1 whose function is to allow closing of orifices 11. This sleeve 20 comprises grooves 21 into which an operating tool lowered into the inner space of the production pipe can fit. By traction on this tool, the sleeve is moved in translation so as to close orifices 11.

FIG. 2 is a perspective view of crown 4 equipped with a certain number of tubes 5 preferably evenly distributed around a diameter. The section of the tubes can be square, rectangular, circular, elliptical or bean-shaped so as to allow to best occupy the space of a toric sector.

FIG. 3 is a cross-section along AA of the liner. Filter element 9 consists of a wire 15 wound and welded on supports 14 arranged along the radius and resting longitudinally along the outer surface of base tube 1. The number of supports 14 depends on the diameter of the device. FIG. 3 shows the layout of tubes 5 between two supports 14. In the variants using perforated sheets or woven cloths, the sheets are folded around the supports to form a cylinder.

FIG. 4 is a side view of supports 14 which comprise passages such as orifices 16 or machined passages 17 which allow free circulation of the effluent around the periphery of tube 1. The area of passage has to be sufficient not to disturb adjustment of the pressure drops.

FIG. 5 illustrates an example of closing means for a tube 5. In crown 4, tapped bores 18 run through pipes 8 so that a screw 19 can close pipe 8 when it is screwed on and allow flow when the screw is undone. This adjustment can be performed with tongs.

The device consisting of these elements can be manufactured and assembled as follows:

filtration element 9 equipped with supports 14 is manufactured on a mandrel, the connecting threads, orifices 11 are machined on a base tube, crown 4 equipped with pipes 8, the pipe closing means, tubes 5 is manufactured, crown 4 is slipped onto the tube and fastened, the filtration element is set from the other end of the tube by placing tubes 5 between supports 14, crown 10 is fastened to tube 1 and the filtration element, or another crown 4 equipped with collecting tubes is set, hood 12 is set so as to seal annular chamber 13.

According to the invention, the pressure drop level of each device is adjusted while the liner devices are assembled at the surface. Depending on the length of the drain hole, and considering the position of each device in relation to the producing formation, a certain number of collecting tubes are closed or opened so as to increase or to decrease the pressure drops due to the flow of effluent through the device according to the invention.

In cases where liners are used for injection, the fluid injected circulates in the opposite direction in relation to the direction of flow during production, i.e. from the inner space of the base tube, through openings 11, then into tubes 5 where pressure drops are created, before flowing out through the filter elements and into the surrounding geologic formation.

The invention claimed is:

1. A controlled-pressure drop liner device comprising a circumscribed filter element centered on a base tube by longitudinal braces in relation to the axis of the tube and arranged according to the diameter of the tube so as to divide the annular space defined by the filter element and the tube into sectors delimited by said braces, and in which collecting tubes are arranged and open into said sectors by one end, the collecting tubes having another end operably connected to an inner space of the base tube so that the pressure drop is a function of a dimension and number of collecting tubes.

2. A device as claimed in claim 1, wherein said braces comprise openings so that the sectors communicate hydraulically with one another.

3. A device as claimed in claim 1, wherein the annular space between the base tube and the filter element is closed at both ends by crown-shaped parts and wherein said collecting tubes are fastened to one face of a crown at the level of bores in the crown so that the inner channel of each collecting tube communicates with the other face of the crown.

4. A device as claimed in claim 3, wherein said crown comprises means for closing said bores.

5. A device as claimed in claim 3, wherein said annular space is closed at both ends by crowns carrying collecting tubes.

6. A device as claimed in claim 1 wherein openings in the base tube allow flow of an effluent in the inner space of said tube after circulation through filter element and collecting tubes, and wherein a sliding sleeve inside the base tube is suited to close said openings.

7. A device as claimed in claim 6, wherein the another end of the collecting tubes opens to a chamber surrounding the base tube, the chamber being in communication with the openings in the base tube.

8. A method for collection of an effluent, comprising forming a filter pipe by placing the device as claimed in claim 1 in a drain hole intended for collection of an effluent, and collecting effluent from the drain hole through the device.

9. A method for injection of a fluid, comprising, forming a filter pipe by placing the device as claimed in claim 1 in a drain hole intended for injection of a fluid, and injecting a fluid into the drain hole through the device.

10. A filter pipe for collection of effluent, comprising the device of claim 1 placed in a drain hole.

11. A filter pipe for injection of a fluid, comprising the device of claim 1 placed in a drain hole.

* * * * *